United States Patent

[11] 3,624,406

| [72] | Inventors | Raymond John Martin<br>516 Edgeworth St., Middlesex Borough, N.J. 08846;<br>Ping King Tien, 19 Lisa Drive, Chatham Township, Morris County, N.J. 07928;<br>Reinhard Ulrich, 4 Imperia Place, Matawan, N.J. 07747 |
|------|-----------|---|
| [21] | Appl. No. | 49,614 |
| [22] | Filed | June 25, 1970 |
| [45] | Patented | Nov. 30, 1971 |

[54] NONLINEAR GENERATION OF A FREELY PROPAGATING BEAM BY A GUIDED BEAM
4 Claims, 4 Drawing Figs.

[52] U.S. Cl............................................. 307/88.3, 321/69 R, 330/4.5

[51] Int. Cl............................................. H03f 7/04
[50] Field of Search................................. 307/88.3; 321/69 R

*Primary Examiner*—Roy Lake
*Assistant Examiner*—Darwin R. Hostetter
*Attorneys*—R. J. Guenther and Arthur J. Torsiglieri

ABSTRACT: A thin-film device for second harmonic generation in which the fundamental beam is carried by the film and the second harmonic is generated as a freely propagating well-collimated beam in the substrate. The process is basically a Cerenkovlike radiation process, achieved when the optical dispersions of the film and substrate materials provide that the fundamental propagates faster in its guided mode than the second harmonic propagates freely in the substrate. An example is a polycrystalline ZnS film on a ZnO substrate, neither being significantly birefringent.

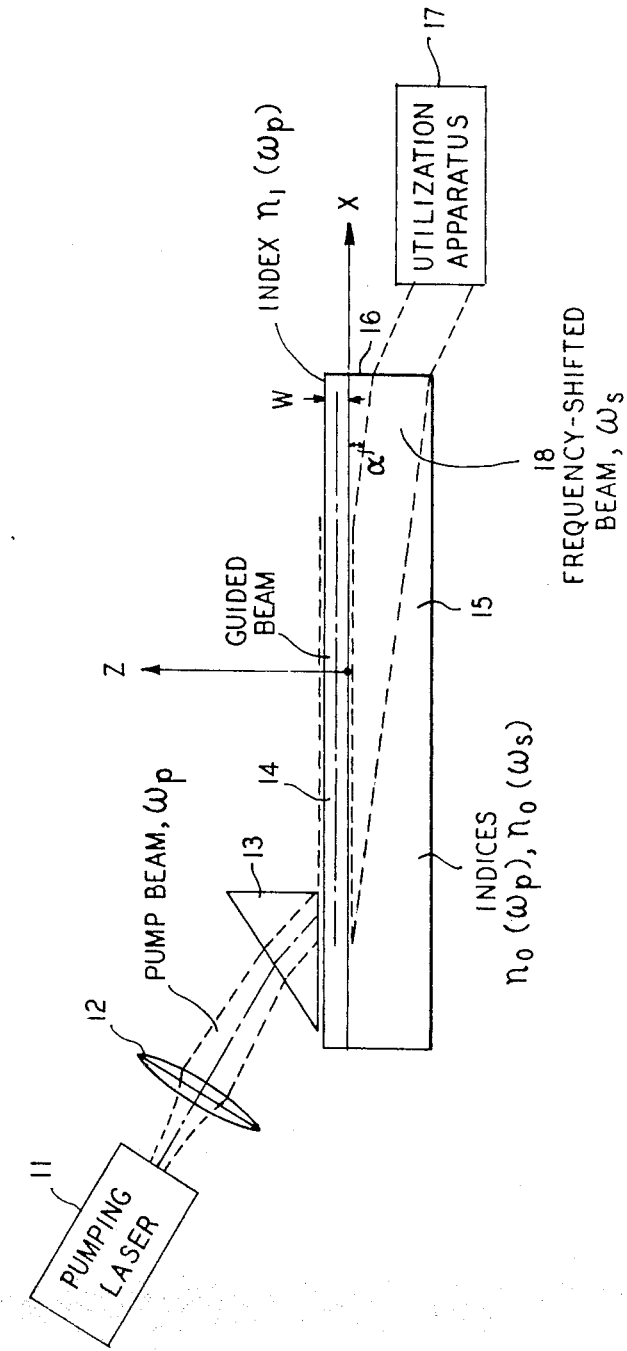

3,624,406

NONLINEAR GENERATION OF A FREELY PROPAGATING BEAM BY A GUIDED BEAM

BACKGROUND OF THE INVENTION

This invention relates to apparatus for carrying out nonlinear interaction processes with light. Typical of such interaction processes is harmonic generation and other types of frequency shifting.

Various techniques for carrying out nonlinear interaction processes with optical waves are now known. In such processes it is important to achieve high intensities of optical power in a localized volume to realize high efficiencies. In the copending application of one of us, P. K. Tien, Ser. No. 793,696, filed Jan. 24, 1969, assigned to the assignee hereof, there is described a technique for coupling light in and out of a thin film of a suitable material superposed on a suitable substrate of different refractive index whereby the film serves as a waveguide for the light waves. This technique makes it feasible to concentrate the power of a light beam into a very thin film and so to realize in the film intensities higher than in the original light beam.

The use of such techniques in which the film guides at least two waves while their evanescent fields produce nonlinear interaction processes in the substrate, is disclosed in the copending patent application of one of us, P. K. Tien, Ser. No. 817,678, filed Apr. 21, 1969 and assigned to the assignee hereof. That technique provides substantial flexibility in achieving phase-matched nonlinear interaction. For example, it is thereby possible to use nonlinear optical materials which utilize little or no birefringence. Nevertheless, in that invention, it is still necessary to couple the nonlinearly generated wave out of the thin film for utilization, for instance, by the technique of the first above-cited copending patent application. Moreover, phase-matched second harmonic generation can be obtained only with difficulty by using interaction of the evanescent fields of both waves as guided by the thin film.

That technique also requires that a certain particular mode of the pumping wave be launched into the thin film in order to achieve phase-matching with a different mode of the generated wave.

The present invention is directed to a technique for solving the aforementioned problems and completely avoiding the need for birefringence in the waveguiding film and substrate.

SUMMARY OF THE INVENTION

In accordance with the present invention, the aforementioned problems are solved in a thin-film device in which the pumping beam is guided by the film, and a nonlinearly generated wave propagates freely into the substrate. According to a principal feature of the invention, the guiding thin film is made to have a phase propagation constant, typically by choosing its thickness in a proper relation to the wavelength of the pumping beam, in a range permitting the pumping beam to propagate faster in the film than the generated wave can propagate in the substrate. The resulting generation can be interpreted as a Cerenkov radiation process.

The advantages of our present invention include the following:
1. For the first time, phase-matched generation of a freely propagating second harmonic beam is possible in a crystal without needing the aid of any birefringence;
2. For the first time, the nonlinear interaction takes place by coupling between a guided wave in the film and a freely propagating wave in the substrate;
3. The generated radiation is a well-collimated light beam ready for use as a light source and extractable through the end face or other suitable surface of the substrate without special coupling means; and
4. The fundamental wave, the pumping wave, may be launched into the film in any desired mode of the film.

A further particular advantage associated with the last-mentioned advantage is that, for the $m=0$ mode, the film can be very thin. The resulting concentration of the fundamental light field in the film results in extremely efficient second harmonic generation.

It is obvious from the theory of parametric interaction that the process described above for second harmonic generation can be applied equally well for frequency mixing. For example, two waves of frequencies $\omega_1$ and $\omega_2$, respectively, may be fed into the thin film by the prism-film coupler simultaneously. The resultant nonlinear polarization in the substrate then contains the sum frequency $\omega_1$ and $\omega_2$ and, thus, it generates a well-collimated beam of light of the sum frequency $\omega_1$ and $\omega_2$ and at an angle $\alpha$ from the X-axis.

BRIEF DESCRIPTION OF THE DRAWING

A more complete understanding of the invention will be obtained from the following detailed description, taken together with the drawings, in which:

FIG. 1 is a partially pictorial and partially block diagrammatic illustration of a typical embodiment of our invention;

DESCRIPTION OF ILLUSTRATIVE EMBODIMENT

Figure 2B:
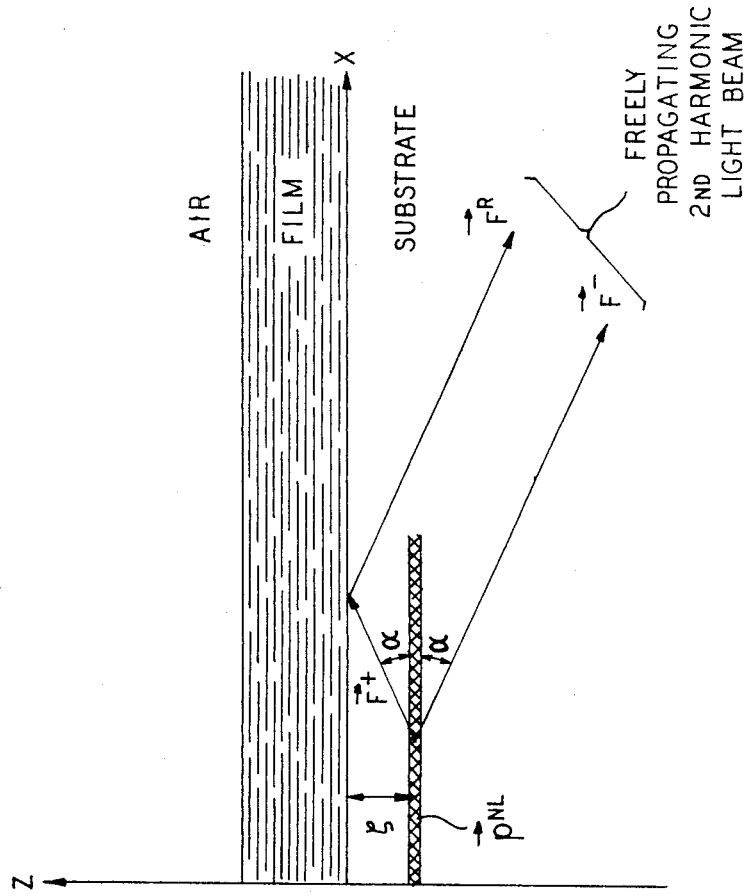
FIGS. 2A and 2B show certain representative relationships of the interacting light fields of the embodiment of FIG. 1.

In the illustrative embodiment of FIG. 1, it is desired to generate second harmonic radiation from fundamental radiation that is supplied by the pumping laser 11, focused by lens 12 and coupled through an appropriate coupler 13 into the thin film 14. The film 14 is deposited on the surface of a nonlinear optical substrate material 15. The generated beam 18 of second harmonic radiation propagates freely in the substrate at an angle $\alpha$ with respect to the direction of the guided pumping beam. It leaves the substrate through the end surface 16 for use in a utilization apparatus 17, which could be an optical modulator or other device in an optical communication system.

The pumping laser 11 is illustratively a pulsed laser operating at 1.06 micrometers and employing neodymium ions in a YAG host crystal. The coupling device 13 is typically a prism-film coupler, as described in the first above-cited copending patent application. The coupler consists of a rutile (titanium dioxide $TiO_2$) prism separated from the thin film by a narrow gap typically of the order of less than one wavelength of light. The film 14 is illustratively a zinc sulfide film of 220 nanometers thickness and refractive index 2.29. It is vacuum deposited on the substrate 15, which is illustratively a single crystal of zinc oxide (ZnO), oriented with its optical axis normal to the plane of the drawing of FIG. 1. The film and substrate could also consist of other materials which are transparent at both the pumping and the second harmonic wavelength. The substrate material has a nonvanishing nonlinear optical coefficient, and the two materials satisfy appropriate refractive index relationships at the fundamental and at the harmonic wavelengths. These index relationships are useful in the present invention and will be more fully explained hereinafter in connection with the description of the theoretical background of the invention.

An understanding of the operation of the invention may be based on the following principles:

First, it is the evanescent field of the fundamental guided beam in thin film 14 which is effective to generate the nonlinear interaction in substrate 15. The evanescent field of the guided wave is that portion of its electromagnetic fields which extends outside of the guiding structure, e.g., film 14, and, for purposes of this invention, extend into the substrate 15.

Second, the nonlinear interaction produced according to the present invention, while dependent on the well-known second order nonlinear coefficients of the substrate material, is a new effect. It may be interpreted as a type of Cerenkov effect produced by light waves instead of by the high-speed particles traditionally known to generate the Cerenkov radiation.

Our invention generalizes the Cerenkov effect to include the emission of electromagnetic radiation by a field of dielectric polarization that moves at a higher speed through a dielectric medium than the speed of light in that medium. The dielectric polarization wave is a spatially and temporally periodic motion of charge carriers in response to a perturbation. In the traditional Cerenkov effect, this perturbation is produced by the motion of charged particles which are shot through the material.

In the "optical" Cerenkov emission, which we consider here, the polarization field is generated by the nonlinear dielectric response of the substrate medium to the pumping light wave that is being guided along the thin film on one surface of the medium. The nonlinear polarization contains the second harmonic $2\omega$ of the pumping light frequency $\omega$, and it travels with the same velocity $\bar{v}=c/\beta$ as the guided pumping wave, where $c$ is the velocity of light and $\beta$ is a phase propagation constant for the guided wave and is dimensionally similar to an index of refraction.

It is known from the above-cited copending patent applications that $n_o<\beta$ is a necessary condition for the guidance of light, where $n_o=n_o(\omega)$ is the index of refraction of the substrate at frequency $\omega$. The phase velocity of second harmonic light in the substrate is $v_{ph}=c/n_o(2\omega)$. If, now, $\beta<n_o(2\omega)$ the Cerenkov condition $\bar{v}>v_{ph}$ is fulfilled; and second harmonic light can be emitted from the nonlinear polarization field as a wave propagating freely into the substrate.

This situation can be realized experimentally for most optically transparent materials, since it requires $$n_o(\omega)<\beta<n_o(2\omega). \quad (1)$$

The normal optical dispersion guarantees that such finite range (1) exists, and the position of $\beta$ in this range can be controlled conveniently by choosing the thickness W of the guiding film.

The emitted radiation propagates at the Cerenkov angle $$\alpha = \text{arcos}\,(v_{ph}/\bar{v}) = \text{arcos}\,[\beta/n_o(2\omega)] \quad (2)$$

with respect to the direction of motion of the field of nonlinear polarization, see FIG. 1. In the traditional Cerenkov effect, where the induced polarization has a filamentary geometry, the directions $\alpha$ form a cone with this filament as axis. The nonlinear polarization of a single-mode optical surface wave, however, fills in general a thin volume near the surface of the substrate, that is many wavelengths wide and coherent in the $y$ direction (normal to the plane of FIG. 1). Therefore, by interference of the waves emitted from various parts of this volume, the radiation intensity vanishes over most of the Cerenkov cone except for the direction $\alpha$ that falls into the plane of FIG. 1. The Cerenkov radiation then has the form of a quasiplane wave.

We have recently demonstrated this second harmonic generation by the "optical" Cerenkov effect in the experimental arrangement of FIG. 1. The thickness W of the film was 2,000 A., the vacuum wavelength $\lambda$ was 1.06$\mu$m, and the polarization of the incident fundamental light was chosen so that this light was guided as a $TE_o$ mode with $\beta$=2.02. That part of the guided wave that penetrated into the substrate generated there a field of nonlinear polarization via the $d_{333}$ nonlinear coefficient. With $n_o(\omega)$=1.95 and $n_o(2\omega)$=2.05, the condition (1) was satisfied and second harmonic light was generated. It was observed as a collimated beam of green light emerging from the ZnO crystal as shown in FIG. 1.

It will be noted that the operation according to the present invention does depend on the orientation of the optic axis ($z$-axis) of the single crystal zinc oxide substrate only insofar as the nonlinear dielectric response of the substrate is concerned. The operation does not depend, however, on birefringence of any of the materials constituting the device. This is in marked contrast to other techniques for efficient second harmonic generation which depend on the birefringence of the nonlinear crystal for the purpose of phase-matching. The fact that the zinc oxide substrate used in the foregoing experiment does have a small birefringence is unimportant to the present invention.

DETAILED THEORY

We shall compute the second harmonic power that is emitted in a given "optical Cerenkov coupler." A discussion of the influence of some of the relevant parameters will show then how to obtain maximum power output.

The theory will be divided in four parts. In the first one, we calculate the field of nonlinear polarization $\vec{P}^{NL}$ that is generated in the substrate by a guided wave. In the second part, we consider an infinitesimally thin sheet of this field $\vec{P}^{NL}$ and derive the Cerenkov radiation emitted from it. This deviation will show some interesting details of the emission process. In the third part, finally, the Cerenkov emission of the total field $\vec{P}^{NL}$ is obtained by integrating over all sheets that constitute $\vec{P}^{NL}$ (method of Green's function).

Theory Part I: Computations of $\vec{P}^{NL}$

We restrict ourselves here to a two-dimensional analysis in which all fields are independent of the $y$ coordinate. The obtained results will later be extrapolated to a three-dimensional case with $y$-dependent fields. All quantities with a bar over them refer specifically to the fundamental wave. Absolute c.g.s. units are used. The electrical field in the substrate accompanying the fundamental guided wave is an evanescent wave $$\vec{E}(x,z,t)=\vec{E}_o \exp\,[ik\beta x+k\bar{\Gamma}_o z-i\bar{\omega}t] \quad (3)$$

where $\bar{k}=\bar{\omega}/c$ is the vacuum propagation constant, $\beta$ is the normalized propagation constant mentioned above, $k\bar{\Gamma}_o\equiv\bar{k}(\beta^2-n_o^2)$ is the real spatial decay constant of the field, and $\bar{\omega}$ the angular frequency of the light. This evanescent field is represented in FIG. 2A by the shaded area. The amplitude vector $\vec{E}_o$ of this field (3) can be decomposed in two ways: First, into its components $E_{o,\rho}$ with respect to the coordinate axes $\vec{\alpha}_\rho$, $\rho=x,y,z$ of the Cartesian coordinate system shown in FIG. 1, and second into its components $E_{o,j}$ along the three orthogonal crystallographic axes $\vec{\alpha}_j$, $j=1, 2, 3$ of the substrate material:

$$\vec{E}_o \equiv \sum_\rho E_{o,\rho}\vec{\alpha}_\rho \equiv \sum_j E_{o,j}\vec{\alpha}_j \quad (4)$$

Thus, Arabic subscripts refer to the internal crystal axes, and Greek subscripts to the $xyz$ coordinate system of the film. The nonlinearly generated field $P^{NL}$ of second harmonic polarization is expressed by means of the well-known nonlinear dielectric tensor relation $$\vec{P}^{NL}=\sum_{ijk}d_{ijk}\vec{\alpha}_i E_{o,j}E_{o,k}\exp\,[ik\beta x+k\bar{\Gamma}_o z-i\omega t] \quad (5)$$

where $k=2\bar{k}$ and $\omega=2\bar{\omega}$ refer to the harmonic. Using the direction cosines $h_{i\rho}\equiv(\vec{\alpha}_i\vec{\alpha}_\rho)$ between the unit vectors $\vec{a}_i$ and $\vec{\alpha}_\rho$, the field $\vec{P}^{NL}$ is expressed in the $xyz$ system. We abbreviate $\vec{P}^{NL}=\vec{p}(z)\exp(ik\beta x-i\omega t)$ and have $$\vec{p}(z)=\sum_{ijk\rho\mu\nu}d_{ijk}h_{i\rho}h_{j\mu}h_{k\nu}E_{o,\mu}E_{o,\nu}\vec{\alpha}_\rho\exp\,(k\bar{\Gamma}_o z) \quad (6)$$

It is convenient to express the factors $E_{o,\mu}$ and $E_{o,\nu}$, appearing here through the total fundamental power P carried (per unit width in the $y$ direction) by the guided wave, in the form:

$$E_{o,\mu}=(\eta\bar{P})^{1/2}e_\mu \quad (7)$$

The $e_\mu$ depend on polarization. For a fundamental TE wave $e_y=1$; $e_x=e_z=0$; and for a TM wave $e_x=\bar{\Gamma}_o/\bar{n}_o$; $e_z=-i\beta/\bar{n}_o$; $e_y=0$.

The quantity $\eta$ has the meaning of an impedance $$\eta\equiv\frac{16\pi\bar{k}\bar{\Gamma}_o\bar{u}}{\beta c} \quad (8)$$

with $\bar{u}$ indicating what fraction of the total fundamental power $\bar{P}$ flows in the substrate region $z<0$. The quantity $\bar{u}$ represents the evanescent field shown in FIG. 2A. With the help of Equation (7) we can express $\vec{p}(z)$ now as $\vec{p}(z) = n\vec{P}\vec{d}\exp(k\vec{\Gamma}_o z)$ (9) The components of the vector $\vec{d}$ in the $xyz$ system are $$d_\rho = \sum_{ijk\mu\nu} d_{ijk} h_{i\rho} h_{j\mu} h_{k\nu} e_\mu e_\nu \qquad (10)$$

They depend on the orientation and the nonlinear optical coefficients of the substrate, and on the polarization of the fundamental wave. Many different combinations are possible here. For the specific experimental arrangement of FIG. 1 with a TE wave and the optic axis of the ZnO substrate in $y$ direction, Equation (10) yields, for example, $d_y = e_{333}$; $d_x = d_y = 0$.

II. Emission from a Thin Sheet of Polarization

Figure 2A:
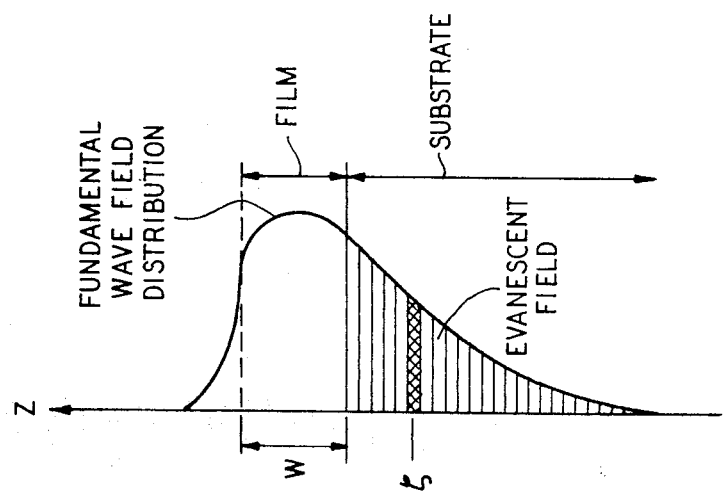

The field $(g)$ is split up into infinitesimally thin "sheets" parallel to the surface of the substrate, as shown in FIG. 2B. A typical sheet, positioned at depth $\zeta$ in the substrate, has the form $$\vec{P}^{NL}(x,z,t) = \vec{p}(\zeta)\,\delta(z-\zeta)\exp(ik\beta x - i\omega t) \qquad (11)$$

where $\delta$ denotes Dirac's delta function. The radiation field $F(x,z,a,t)$ generated by this field in the substrate is found from the inhomogeneous wave equation $$\nabla \times \nabla \times \vec{F} - k^2 n_o^2 \vec{F} = 4\pi k^2 \vec{P}^{NL} \qquad (12)$$

where $n_o = n_o(2\bar{\omega})$ is the refractive index of the substrate at the harmonic. The field $\vec{F}$ has the form $\vec{F} = \vec{F}_o(z,\zeta)\exp(ik\beta x - i\omega t)$ where the vector function $\vec{F}_o(z,\zeta)$ follows (neglecting depletion of the fundamental power) from $\partial F_{o,x}/\partial z^2 + k^2 n_o^2 F_{o,x} = ik\beta \partial F_{o,z}/\partial z - 4\pi k^2 p_x(\zeta)\delta(z-\zeta)$
$\partial^2 F_{o,y}/\partial z^2 + k^2(n_o^2-\beta^2)F_{o,z} = ik\beta F_{o,x}/\partial z - 4\pi k^2 p_z(\zeta)\delta(z-\zeta)$
(13)
$k^2(n_o^2-\beta^2)F_{o,z} = ik\beta \partial F_{o,x}/\partial z - 4\pi k^2 p_z(\zeta)\delta(z-\zeta).$ The solution of these equations is two plane waves with the phase factors $$\Psi^\pm(x,z,t) \equiv \exp[ik\beta x + ik\xi_o z - i\omega t] \qquad (14)$$

where $\xi_o \equiv (n_o^2 - \beta^2)^{1/2}$ is real if $\beta$ is in the range defined by inequality (1). These plane waves, one of them direct and one of them reflected as shown in FIG. 2B, propagate freely into the substrate material, forming the Cerenkov angle $\alpha$ with the $X$-axis that had been given in Equation (2). The Cerenkov angle vanishes $\alpha \to o$ if $\beta$ approaches the upper limit of the range (1), $\beta \to n_o$. If $\beta$ approaches the lower limit of that range, $\beta \to \bar{n}_o$, the Cerenkov angle reaches its maximum possible value $\alpha_{max} = \arccos(\bar{n}_o/n_o)$.

The wave $F^+$ having a phase factor $\Psi^+$ propagates into the space $z > \zeta$, the wave $F^-$ having a phase factor $\Psi^-$ into $z < \zeta$. Their amplitudes are found by integrating Equations (13) over an infinitesimal interval of the $z$-axis containing the source at $z = \zeta$. Observing proper continuity conditions at that point, we obtain $\vec{F}_o(x,z,t,\zeta) = 2\pi i k \xi_o^{-1} \exp(\pm ik\xi_o \zeta)\Psi^\pm(x,z,t)$
$\times\ p_x(\zeta)\sin^2\alpha \pm p_z(\zeta)\sin\alpha\cos\alpha, p_y(\zeta), p_z(\zeta)\cos^2\alpha \pm p_x(\zeta)\sin\alpha\cos\alpha$ (15)

The solution $F^+$ holds in $z > \zeta$, and $\vec{F}^-$ in $z < \zeta$. From Equation (15) it is recognized that the component $p_y$ of $\vec{P}^{NL}$ emits TE-polarized second harmonic light, whereas $p_x$ and $p_z$ emit TM light.

The wave $\vec{F}^-$ propagates directly the utilization apparatus as shown in FIGS. 1 and 2. The $F^+$ wave, however, is propagating from the region $z = \zeta$ of its generation toward the surface of the substrate that carries the light-guiding film. The $F^+$ wave is totally reflected by this film with a reflection coefficient $r$ exp$(-2i\Phi_r)$. The reflection phase $\Phi_r$ depends on the angle $\alpha$, on the refractive indices of all materials involved, and also on the polarization of the $\vec{F}^+$ wave. Here, we consider only the simpler case of $TE$ polarization in which the $\vec{F}^\pm$ waves have only a $y$ component. After reflection, the $\vec{F}^+$ wave becomes $F_y^R(x,z,t,\zeta) = F_y^+(0,0,0,\zeta)\exp(-2i\Phi_r - 2ik\xi_o\zeta)\Psi^-(x,z,t)$
(16)

and travels in exactly the same direction as the $\vec{F}^-$ wave. Thus, the total field is given by the superposition $\vec{F}_s = \vec{F}^- + \vec{F}^R$, and this is the desired radiation field emitted by the sheet (11).

III. EMISSION FROM A GUIDED BEAM

The field $\vec{F}$ that is emitted from the full field $\vec{P}^{NL}$ of the guided beam is obtained by integrating the solution $\vec{F}_s$ found above over the whole substrate region $-\infty < \zeta \leq 0$. Still considering only TE polarization, the only nonvanishing field component is at all points $z << -(k\xi_o)^{-1}$ $F_y(x,z,t)$
$= 4\pi i\eta \bar{P} d_y \xi_o^{-1}[n_o^2 - \bar{n}_o^2]^{-1/2}\cos(\Phi_r - \Phi_e)\exp(-i\Phi_r)\Psi^-(x,z,t)$ (17)

The phase angle $$\Phi_e = \operatorname{atan}(\xi_o/\bar{\Gamma}_o) \qquad (18)$$

has the meaning of an "emission" phase, it varies between $\Phi_e = 0$ for $\alpha \to 0$ to $\Phi_e = \pi/2$ when $\alpha \to \alpha_{max}$.

From (17), and from the corresponding relation for TM polarization, we compute the harmonic power emitted per unit area of the $xy$ plane, separately for each polarization
$S_{TE} = C\bar{P}^2 d_y^2 \cos^2(\Phi_r - \Phi_e)$
$S_{TM} = C\bar{P}^2 [d_x^2 \sin^2\alpha \cos^2(\Phi_r - \Phi_e) + d_z^2 \cos^2\alpha \sin^2(\Phi_r - \Phi_e)]$ (19)

with $$C = 2\pi\eta^2 c\xi_o^{-1}/(n_o^2 - \bar{n}_o^2) \qquad (20)$$

IV. Discussion

From the theory presented here we can determine the conditions for generation of a maximum of second harmonic power. First, a substrate material must be chosen with a high nonlinear optical coefficient that is transparent at both $\bar{\omega}$ and $2\bar{\omega}$, and an optimum orientation has to be found that yields a large component $d_\mu$ for the desired polarization. Second, a suitable film must be deposited on the substrate. Its refractive index at $\bar{\omega}$ must be low enough, to allow propagation of the fundamental beam. The optimum film thickness $W$ must be determined by evaluating Equation (19) for various values of $\beta$ that lie all in the range (1), and choosing that $\beta$ that yields the highest power output. This optimum $\beta_o$ depends on the refractive indices of all media (substrate, film, and region above film in FIGS. 1 and 2) at both the frequencies $\bar{\omega}$ and $2\bar{\omega}$. The determination of $\beta_o$ is complicated by the $\beta$-dependence of the reflection phase $\Phi_r$. Instead of optimizing the power output, it may be desirable for other applications to generate radiation at a particular Cerenkov angle $\alpha$. In that case, $\beta_o$ can be determined by e.g., the theory outlined in the above-cited patent application. Under the conditions of the illustrative embodiment ZnO substrate:    $n_o = 2.0454\ \bar{n}_o = 1.9565$
ZnS film:    $n_1 = 2.3902\ \bar{n}_1 = 2.282$
top region (air): $n_2 = 1.0000\ \bar{n}_2 = 1.000$
fundamental wavelength:    $\lambda = 1.064\mu m$
ZnO nonlinear coefficient: $d_y = d_{333} = 17 \cdot 10^{-9}$ e.s.u.
linear power density:    $\bar{P} = 100$ w./cm.

the above theory yields these operating conditions for maximum power output normalized propag. constant $\beta_o = 2.0391$
Cerenkov angle    $\alpha = 4.50$ degrees
film thickness    $W = 0.2611\ \mu m$
interference factor $\cos^2(\Phi_r - \Phi_e) = 0.417$
output power density    $S_{TE} = 3.9$ mW/cm$^2$ For the computation of the efficiency of the second harmonic generation the guided beam has been assumed infinitely wide in $y$ direction, and the depletion and the absorption of the fundamental had been neglected. Actually, the guided beam has a finite width in $y$ direction and, due to depletion and other losses, also a finite length in $x$ direction. This causes the ideally collimated beam (17) to be spread out over a finite angular width both in the $xz$ plane and in the direction normal to it. The width of this angular spread is inversely proportional to the geometric width of the emitting region. In a typical arrangement, the guided beam is twenty wavelengths wide, and propagates over a distance of 1,000 wavelengths. The corresponding angular spreads are very small. Therefore, in a practical sense, the second harmonic beam is well collimated.

A modification of the embodiment of FIG. 1 would employ a narrow strip of thin-film guide, having a width in the $y$ direction of FIG. 1 that is of the order of only a few wavelengths of the fundamental light, deposited on the substrate material instead of a uniform thin film. This strip would guide the fundamental beam in the $y$ direction and thus inhibit the natural spreading of the beam. Such spreading limits to a certain degree the second harmonic power that can be obtained with a uniform film. Using a strip-guide, however, would allow the available fundamental power to concentrate efficiently so as to obtain a high density $\bar{P}$ over a substantial length of propagation. Experimentally, a strip width of 10 $\mu$m is quite feasible.

Alternatively, a round, fiberlike guide of high refractive index could be embedded in the low-index, nonlinear substrate material. When a light beam of fundamental frequency is suitably launched into this guide, and provided that the Cerenkov condition (1) is fulfilled, optical Cerenkov radiation would be generated that would fill a cone of semioperative $\alpha$ about the guide as axis.

Figure 3:
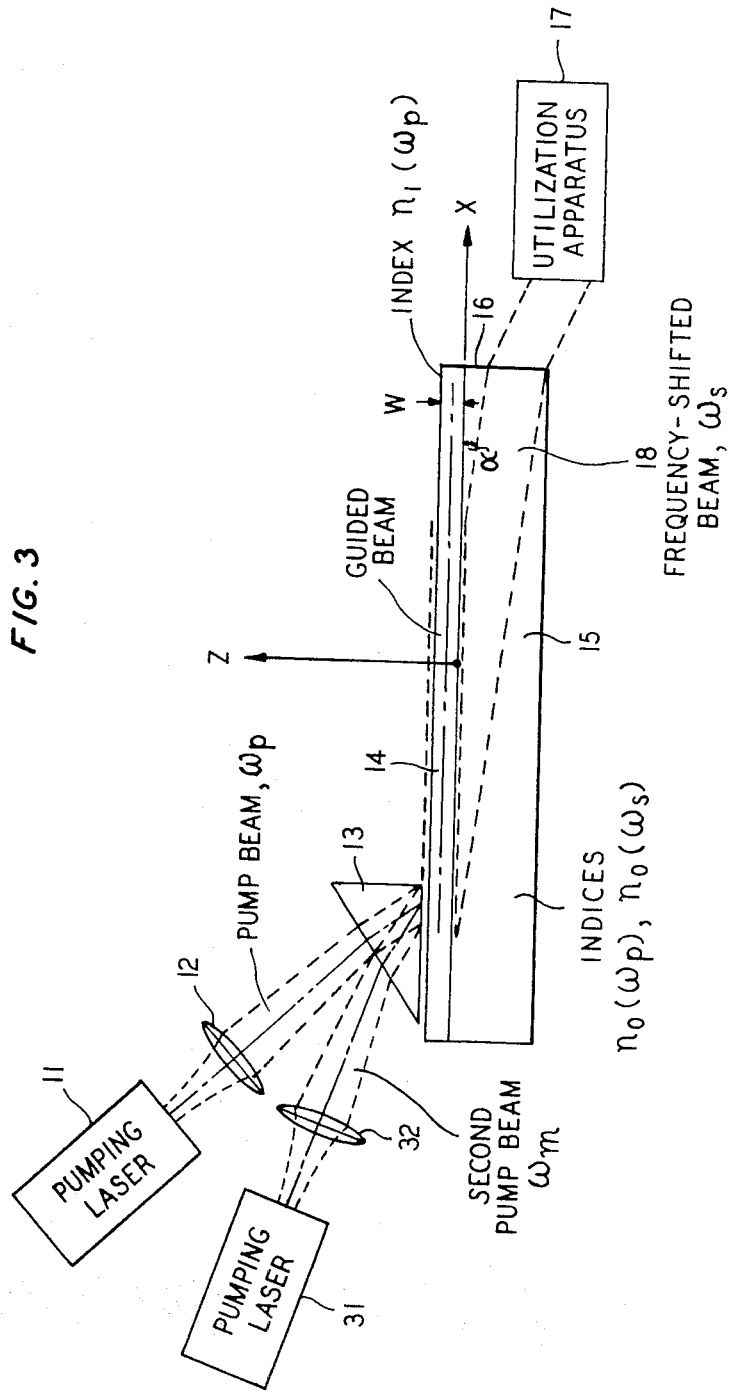
FIG. 3 show a modification of the embodiment of FIG. 1.

The embodiment of FIG. 1 can be modified as shown in FIG. 3 to provide that the freely propagating beam in the substrate has a frequency which is the sum of frequencies of two supplied beams that are guided in the thin film. This follows from the analogy between sum frequency mixing and second harmonic generation, as previously demonstrated in the optical arts.

This modification is implemented by adding to the arrangement of the previous components in FIG. 3 the beam laser 31 and lens 32 which supply a beam at slightly lower frequency than $\omega_p$ and at a lower angle with respect to the normal to film 14. This angle is chosen so that the zero order mode of the second supplied frequency is guided in the film 14 so that the film can remain as thin as before. In that circumstance, the relationships of Equations (1) and (2) above are still satisfied, that is, the index of the substrate at either of the supplied frequencies is less than $\beta$.

We claim:

1. A frequency-shifting device comprising a first transparent body in which a first beam of radiation of a first frequency can be guided with a first phase velocity, a substrate body of nonlinear optical material supporting said first body, means for supplying said first beam to said first body, said substrate body being responsive to the evanescent field of said first beam at a substantially higher frequency of radiation for which the phase velocity is a second phase velocity lower than said first phase velocity to generate a freely propagating beam in said substrate at said higher frequency, and means for utilizing said freely propagating beam.

2. A frequency-shifting device according to claim 1 in which the index of refraction of the first body is $n_1(\omega)$ at the first frequency $\omega$, the first body having for the first beam a phase propagation constant $\beta$ equal to the velocity of light divided by the first phase velocity, and the index of refraction of the second body is $n_o(\omega')$ at the higher frequency $\omega'$, said first body being proportioned to make $$n_o(\omega) < \beta < n_o(\omega').$$

3. A frequency-shifting device according to claim 2 in which the first body is proportioned to make $n_o(\omega) < \beta < n_o(2\omega)$, the second body having a nonlinear response favoring the generation of the second harmonic of the first frequency as the higher frequency.

4. A frequency-shifting device comprising a first transparent body in which first and second beams of radiation of first and second frequencies can be guided with first and second phase velocities, a substrate body of nonlinear optical material supporting said first body, means for supplying said first and second beams to said first body, said substrate body being responsive to the evanescent fields of said first and second beams at a frequency of radiation which is the sum of the frequencies of said first and second beams and for which the phase velocity is a third phase velocity lower than both said first and second phase velocities to generate a freely propagating beam in said substrate at said sum frequency, and means for utilizing said freely propagating beam.

* * * * *